(12) United States Patent
Garcia et al.

(10) Patent No.: US 6,926,320 B2
(45) Date of Patent: Aug. 9, 2005

(54) STAMPED FOLDED BUMPER BEAM

(75) Inventors: Jose Garcia, Grand Ledge, MI (US); Michael Hunt, Wixom, MI (US); Joseph Boczar, Northville, MI (US); Thomas Naubert, Woodhaven, MI (US)

(73) Assignee: Meridian Automotive Systems, Inc., Dearborn, MI (US)

( * ) Notice: Subject to any disclaimer, the term of this patent is extended or adjusted under 35 U.S.C. 154(b) by 0 days.

(21) Appl. No.: 10/188,943

(22) Filed: Jul. 2, 2002

(65) Prior Publication Data

US 2003/0034657 A1 Feb. 20, 2003

Related U.S. Application Data

(60) Provisional application No. 60/302,534, filed on Jul. 2, 2001.

(51) Int. Cl.⁷ .............................................. B60R 19/02
(52) U.S. Cl. .................................. 293/102; 293/120
(58) Field of Search ................................ 293/102, 120, 293/132, 135

(56) References Cited

U.S. PATENT DOCUMENTS

| | | | | |
|---|---|---|---|---|
| 3,779,592 A | * | 12/1973 | Golze et al. | 293/120 |
| 3,924,888 A | * | 12/1975 | Butcher et al. | 293/150 |
| 4,079,975 A | * | 3/1978 | Matsuzaki et al. | 293/132 |
| 4,160,562 A | * | 7/1979 | Crestetto | 293/120 |
| 4,193,621 A | * | 3/1980 | Peichl et al. | 293/142 |
| 4,397,490 A | * | 8/1983 | Evans et al. | 293/120 |
| 4,408,790 A | * | 10/1983 | Shimoda et al. | 293/132 |
| 5,139,297 A | * | 8/1992 | Carpenter et al. | 293/132 |
| 5,269,574 A | * | 12/1993 | Bhutani et al. | 293/102 |
| 5,306,058 A | * | 4/1994 | Sturrus et al. | 293/122 |
| 5,813,594 A | | 9/1998 | Sturrus | |
| 5,876,078 A | * | 3/1999 | Miskech et al. | 293/133 |
| 6,042,163 A | * | 3/2000 | Reiffer | 293/102 |
| 6,240,820 B1 | | 6/2001 | Sturrus et al. | |

FOREIGN PATENT DOCUMENTS

| | | |
|---|---|---|
| DE | 198 29 566 A1 | 2/1999 |
| WO | WO 00/35610 | 6/2000 |
| WO | WO 01/44018 A1 | 6/2001 |

\* cited by examiner

Primary Examiner—Lori L. Coletta
(74) Attorney, Agent, or Firm—McDonnell Boehnen Hulbert & Berghoff LLP

(57) ABSTRACT

A bumper beam and a method of fabrication. In a preferred embodiment, the bumper beam has a generally trussed-shaped section. The method generally comprises stamping a blank to form a front shell portion and rear plate portion; apertures in appropriate positions in the blank to accommodate vehicle rails or components of the bumper; folding the blank along a longitudinal interface line the separates the rear plate portion from the front shell portion so that at some part of the rear plate portion contacts at least some part of the interior side of the front shell portion; and welding parts of the rear plate portion and the front shell portion that are in contact.

10 Claims, 23 Drawing Sheets

STAMPED FOLDED BUMPER BEAM

BACKGROUND OF THE INVENTION

1. Field of the Invention

The invention relates to vehicle bumpers. In one aspect, the invention relates to a stamped folded vehicle bumper beam. This application claims priority of provisional U.S. Patent Application Ser. No. 60/302,534, filed Jul. 2, 2001.

2. Description of the Related Art

Bumpers are an integral part of any motor vehicle. The primary function of a bumper is to absorb and distribute impact loading during a collision, thus providing an important safety feature of the vehicle. While a bumper can assume a variety of configurations for providing the safety function, it is desirable that the shape of the bumper conform to the overall styling of the vehicle. Additionally, reducing the bumper weight is an important consideration in meeting fuel efficiency standards.

Bumpers have traditionally been roll formed or stamped from a single blank of material such as steel, and are rigidly attached to the vehicle frame. A roll formed bumper generally takes the shape of an arch with the apex of the arch facing forward toward the direction of travel. The bumper absorbs impact loading through the deformation, i.e. flattening, of the arch. However, flattening of the bumper under impact loading will tend to push the vehicle frame elements outward, thus causing considerable structural damage. Resistance of the bumper to deformation under impact loading is generally a function of the size, shape and strength of the material forming the bumper. Since the strength of the bumper is directly related to its size, it is difficult to obtain a bumper of sufficient strength while at the same time minimizing its weight and thus improving the vehicle's fuel efficiency. Furthermore, roll formed bumpers are typically mounted to the end of the vehicle frame elements, which involves a bumper-to-frame connection which has somewhat less rigidity and strength than a connection which is set back from the end of the vehicle frame elements. Mounting the roll formed bumper to the end of the vehicle frame elements effectively moves the bumper significantly forward of the vehicle chassis with resulting limitation on the vehicle aesthetic design considerations.

One such design consideration is impact performance. It is preferable that the front beam meet vehicle manufacturer specifications, such as managing a bather and a pendulum impact, without damaging adjacent systems.

Other important considerations involve noise, vibration, and harshness (NVH) considerations. The front beam is the first cross member of the vehicle frame and is an integral component of front end frame characteristics. The bumper beam design must also accommodate studio design constraints, which can include such aesthetic characteristics as a highly swept front end and an increased frame length of the front rails for improved crash performance.

Since the top surface of the front bumper beam can be visible in a lower air opening for the vehicle front end, the appearance of a bumper should meet design studio intent for a styled and integrated look with the front fascia for the bumper. In addition, the front beam cannot affect air intake for engine cooling by interfering with airflow in the lower air opening.

Past attempts to solve these functional and aesthetic design constraints have fallen short. One such past prior art attempt was to form the bumper beam as a roll formed beam with a B-shaped cross-section therein. This B-section roll formed beam was attached to a bracket welded to the end of the frame rails. The roll form beam could not meet several of the design objectives. First, the beam could not meet the sweeped appearance required for vehicle aesthetics, it could not accommodate the extra length of the frame rails, and it was positioned relatively high in the lower air opening, which affected both air intake and appearance.

Another past attempt was to form the bumper beam as a roll formed beam with stamped end cap portions. This second attempt included a roll formed section welded to two stamped end caps. The end caps would accommodate the sweep and extra length of the frame rails, but the roll form center section was still visible in the lower air opening of the vehicle.

Another prior art bumper was formed as a stamped open section with a back plate welded thereto to form a closed section beam. While this option proved least costly to manufacture, it was still desirable to reduce the number of parts and forming operations for a fully functional, high-strength and aesthetically-pleasing bumper design.

Further prior art attempts included a hot stamping process to form the bumper beam that proved costly to manufacture but can achieve the higher strengths needed in bumper applications. One standard option for this prior art system of this type was to form the bumper beam out of roll formed B-sections and box sections which include a swept bumper portion to satisfy aesthetic requirements. Ultra high strength steel was used to form this beam and also employed EPP filler pieces to match geometry of whatever bumper fascia assembly was employed.

This stamping prior art process achieved its strength through the use of geometry of the bumper beam cross sections, ultra high strength steel, and the sweep curvature of the bumper. Because this is still a roll formed bumper assembly, this process did not allow the bumper beam to fit closely to the vehicle and include bumper fascias with multiple geometry features as required for many bumper systems. Finally, these types of bumper systems that include swept roll formed sections also include an open arch geometry or a curved beam. When a front centerline impact is encountered, the impact force works to flatten these swept sections out. As a result, the only features of this prior art design resisting this impact force are the strength of the bumper beam material and the vehicle frame rails.

SUMMARY OF THE INVENTION

The invention comprises a stamped, folded, one-flange bumper beam and a fabrication method therefore. A flat steel blank proceeds through a series of stamping and folding operations to provide a bumper beam of the desired shape, which is then welded into a closed, one-flange structure. The forward portion of the vehicle frame elements is received for mounting within the interior of the bumper beam thereby providing a bumper-to-frame connection of increased rigidity and strength, and a bumper beam configuration readily conformable to the overall styling of the vehicle. The bumper beam conforms to the overall styling of the vehicle, is lightweight, and has a high strength-to-weight ratio. The use of a stamped form provides design flexibility to fit the fascia design and interface with other systems. The one-piece beam has an integral back plate that is folded over and welded to the top surface, resulting in a closed section beam that creates a very rigid structural member. The elimination of a bottom welding flange necessary for a separate back plate saves weight and material, and reduces the amount of clearance required for the bottom of the beam. The integral back plate also reduces the need for extra fixturing, welding equipment, and handling, and reduces overall cycle time, thereby reducing overall manufacturing costs.

This concept uses conventional stamping technology without additional extraordinary manufacturing processes. The stamping process can follow any required geometry including the shape of an external bumper fascia employed therewith, eliminating or reducing the need for foam fillers thereby reducing cost.

In addition, the cross sectional design developed for use on the inventive system herein allows use of lower strength steel, gaining strength through geometry thereby reducing cost by using a less expensive material (i.e., not ultra high strength steel). The inventive bumper beam described herein uses the geometry of a truss, which is stronger than an open arch design of prior art roll formed beams. In this design, the curved arch of the bumper beam front face is a longer line than the back plate of closed sections. In centerline impact, the force trying to flatten the arch defined by the front face is resisted by the integral strength of the back plate being in tension. Prior art roll formed beams do not have this advantage. With this design feature, it is not necessary to rely on the vehicle frame rails to resist side thrust caused from flattening of the arch as with prior art roll formed beams.

In addition, no complicated mounting brackets are required thereby reducing costs as well. The inventive front bumper beam described herein meets all applicable design and safety requirements while also being substantially less expensive to manufacture.

The bumper beam meets impact performance requirements, has a closed section and minimum number of fasteners to meet NVH requirements, accommodates both aesthetic considerations and receives the bumper beam frame rail extensions for improved impact performance, and is positioned so that it is visually integrated with the lower air opening at the front end of the vehicle so that it does not impede air flow.

DESCRIPTION OF THE PREFERRED EMBODIMENT

Figure 1:
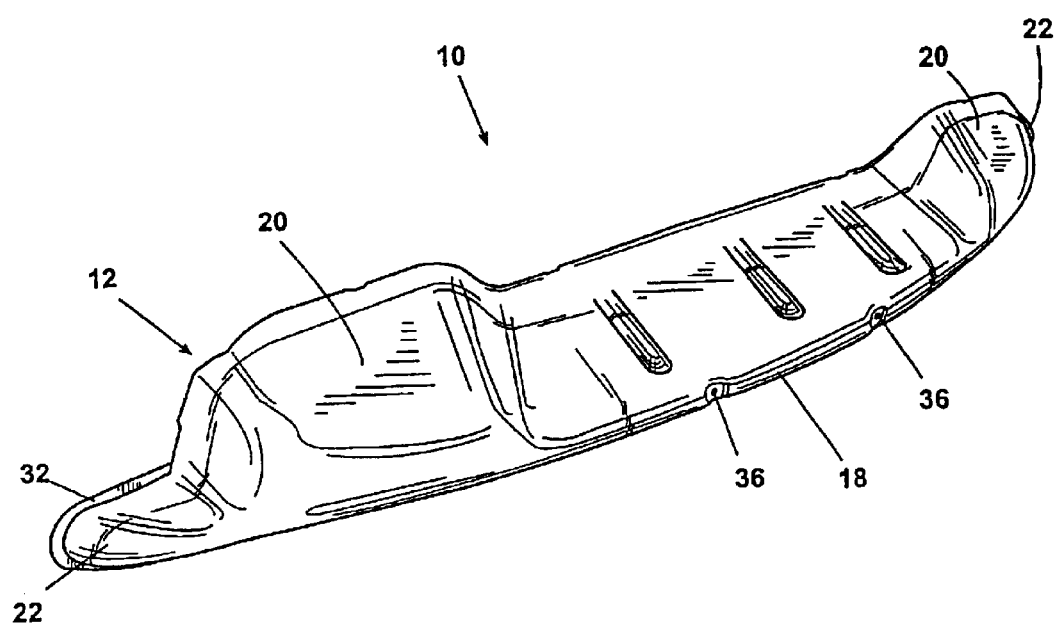
FIG. 1 is a perspective view of a completed bumper beam according to the invention.
Figure 2A:
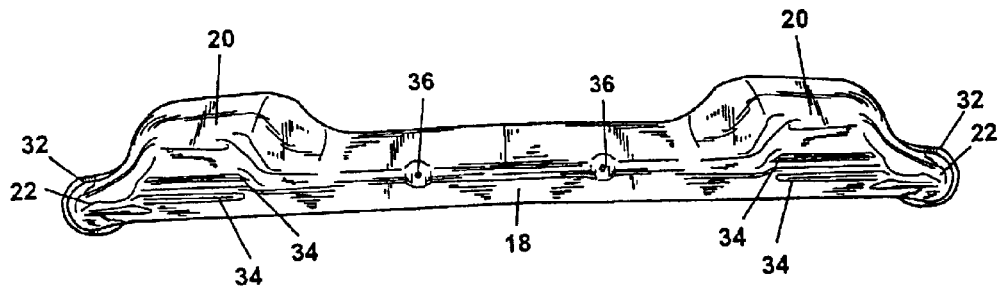
FIGS. 2A–D are front, top, rear, and perspective side views, respectively, of the completed bumper beam of FIG. 1.
Figure 2B:
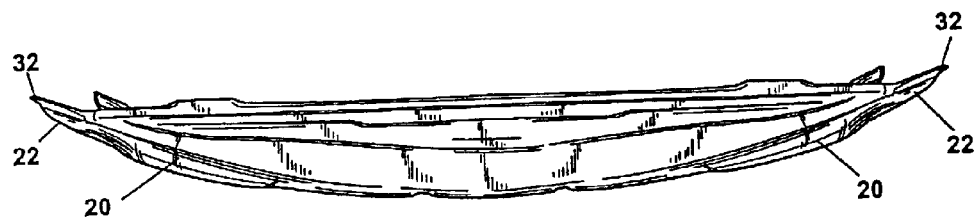
Figure 2C:
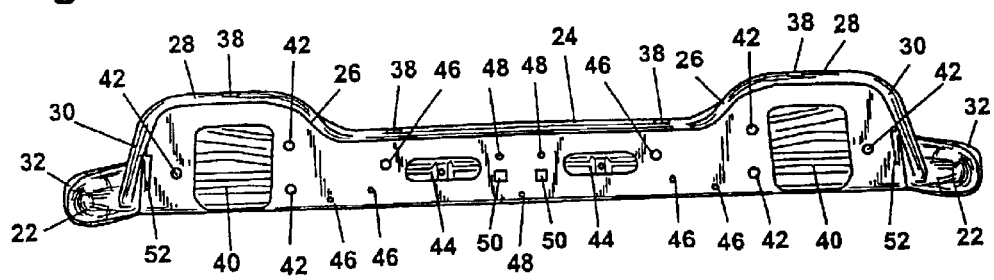
Figure 2D:
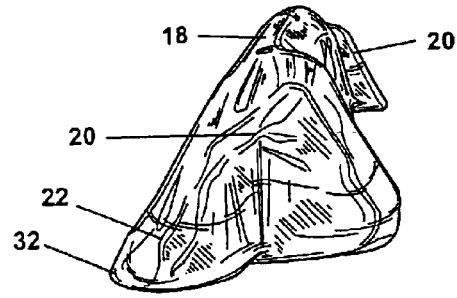
Figure 5A:
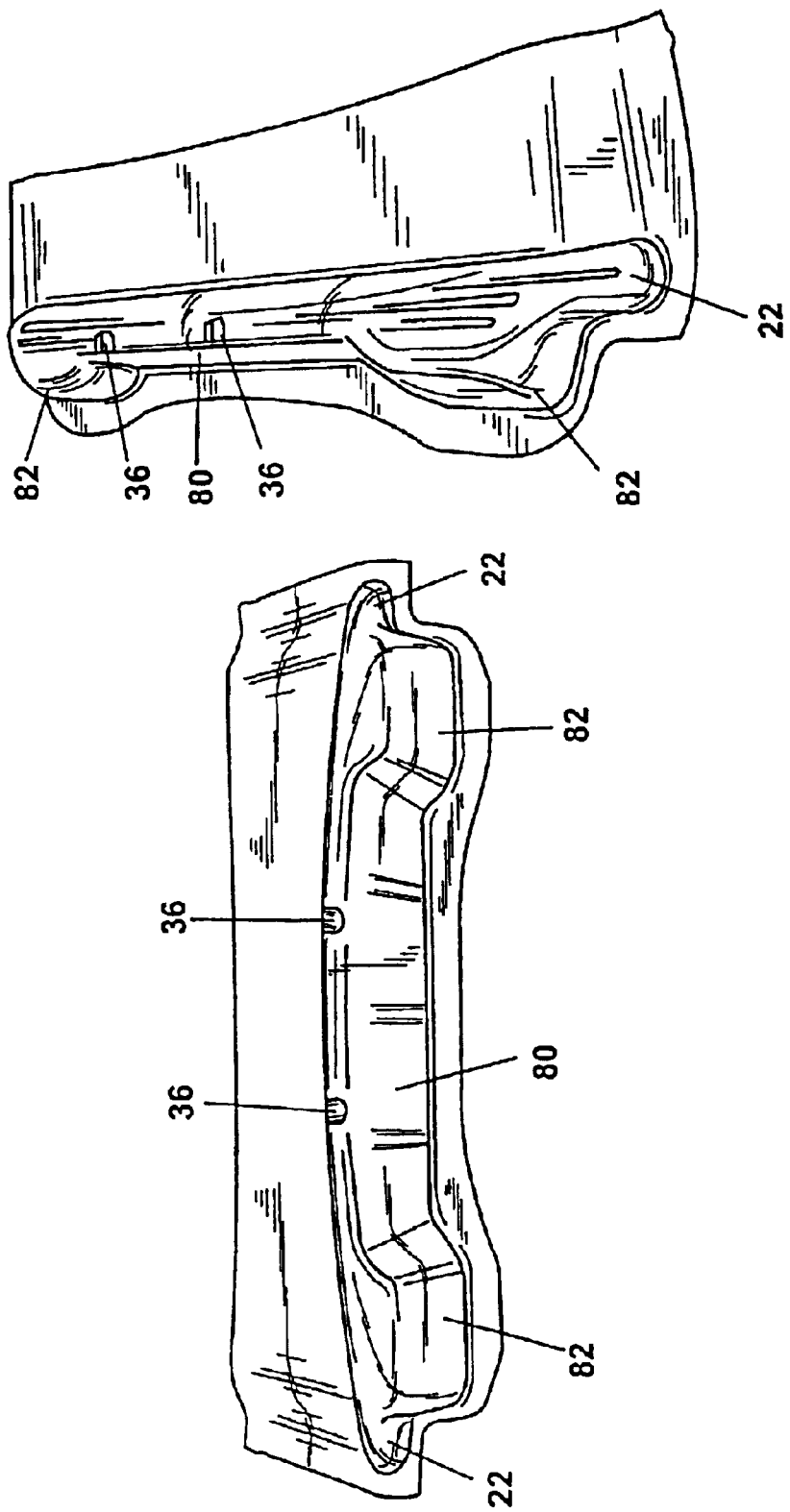
FIGS. 5A-E are perspective views of the bumper beam of FIG. 1 at intermediate steps in the fabrication process.
Figure 5B:
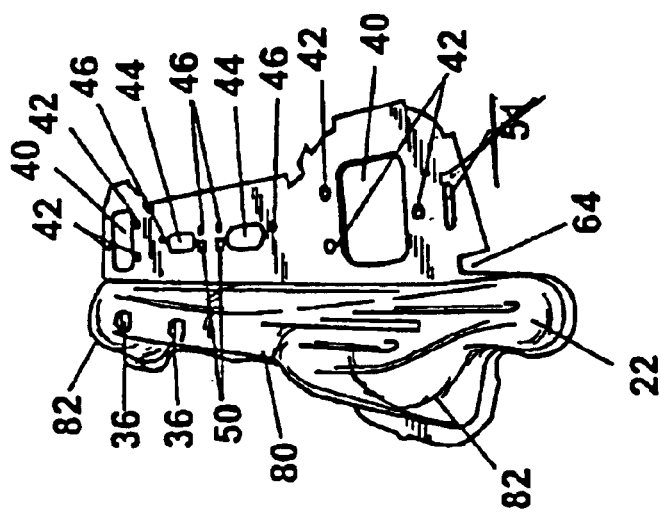
Figure 5B:
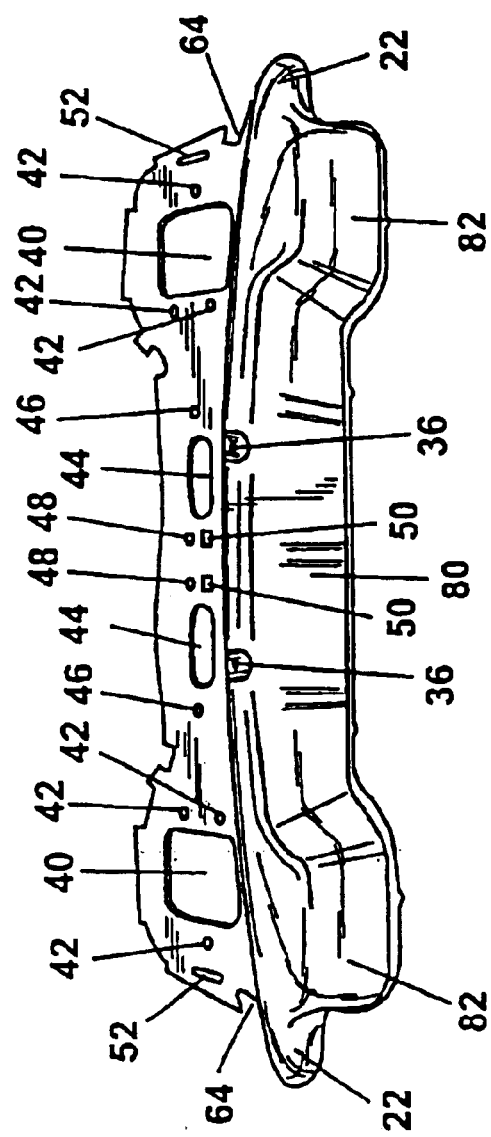
Figure 5C:
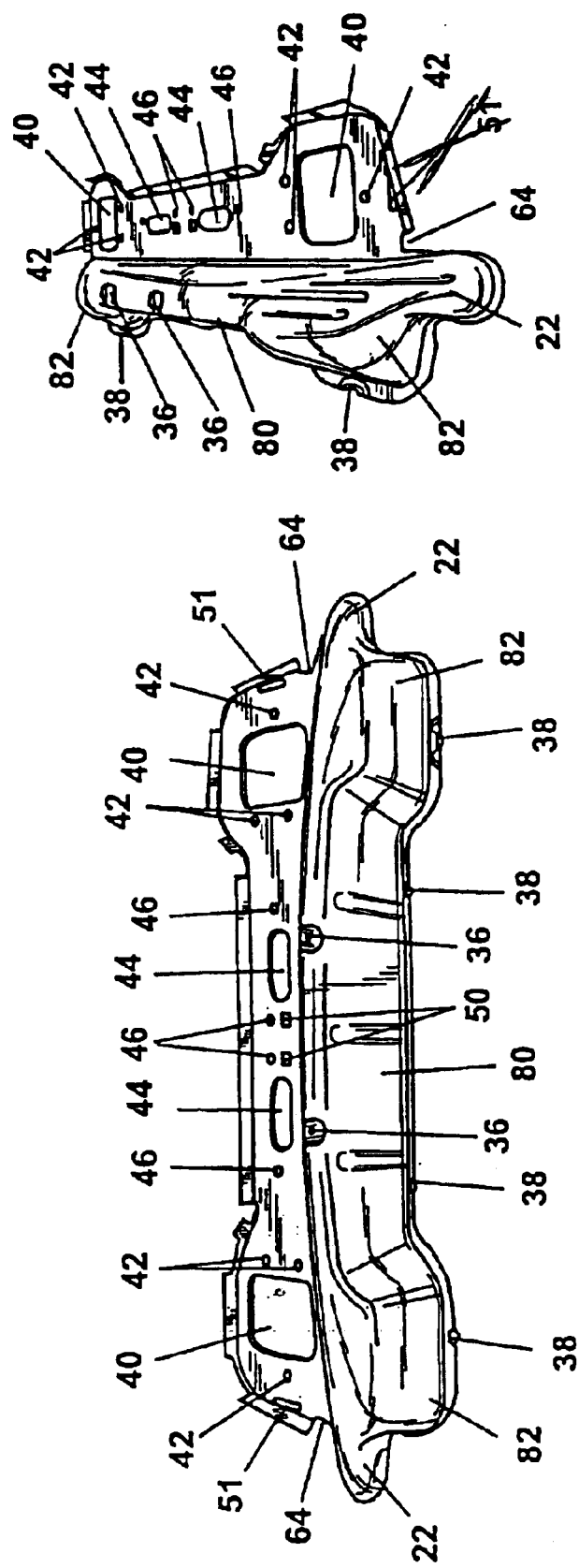
Figure 5D:
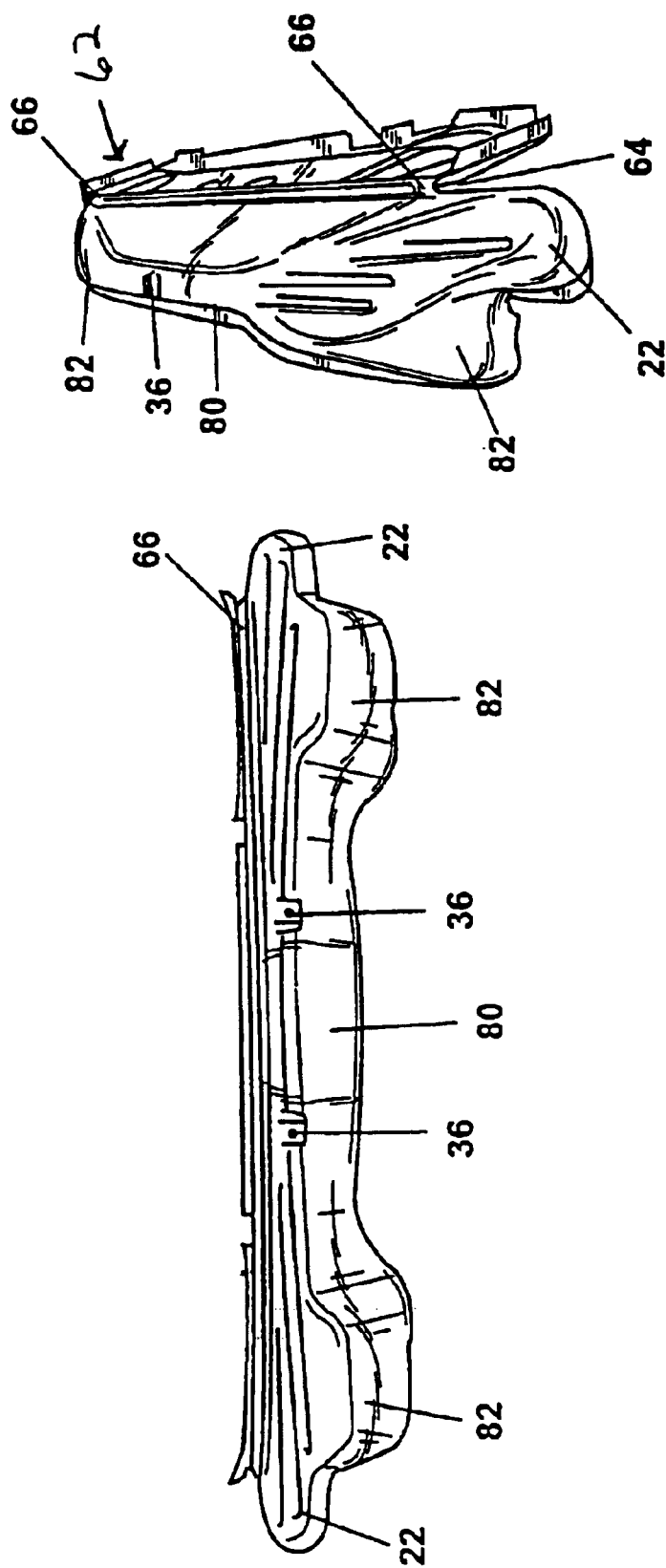
Figure 5E:
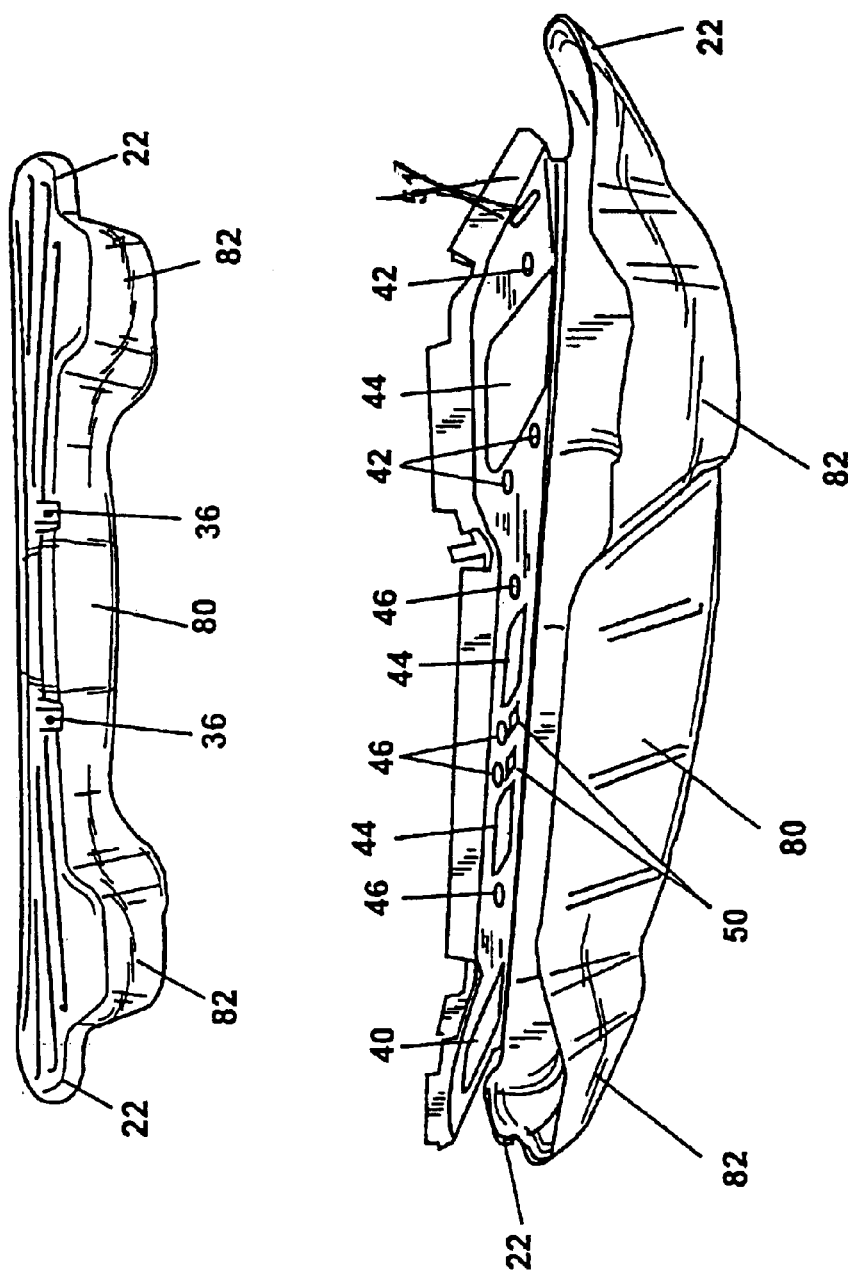

Referring to FIGS. 1 and 2, a stamped folded bumper beam 10 is shown for mounting to the frame rails of a vehicle (not shown) to absorb and distribute impact loads to vehicle frame rails in the event of a collision. The bumper beam 10 is adapted for the mounting of a fascia and other aesthetic or design elements and accessory items such as a license plate and lights, e.g. fog lights, as hereinafter described. The bumper beam 10 is an elongated member comprising a front shell 12 and a rear plate 14 enclosing a beam-interior 16. In the preferred embodiment, the front shell 12 and rear plate 14 are fabricated from a single flange of sheet metal, such as steel, which is stamped and folded to form the finished bumper beam 10. The front shell 12 and rear plate 14 are attached along respective longitudinal edges by a folded web 62 (see FIG. 5D). In the preferred embodiment, the finished bumper beam 10 comprises a center crosspiece 18 extending between a pair of frame rail pockets 20. Extending laterally outwardly of the frame rail pockets 20 are end pockets 22.

Figure 3:
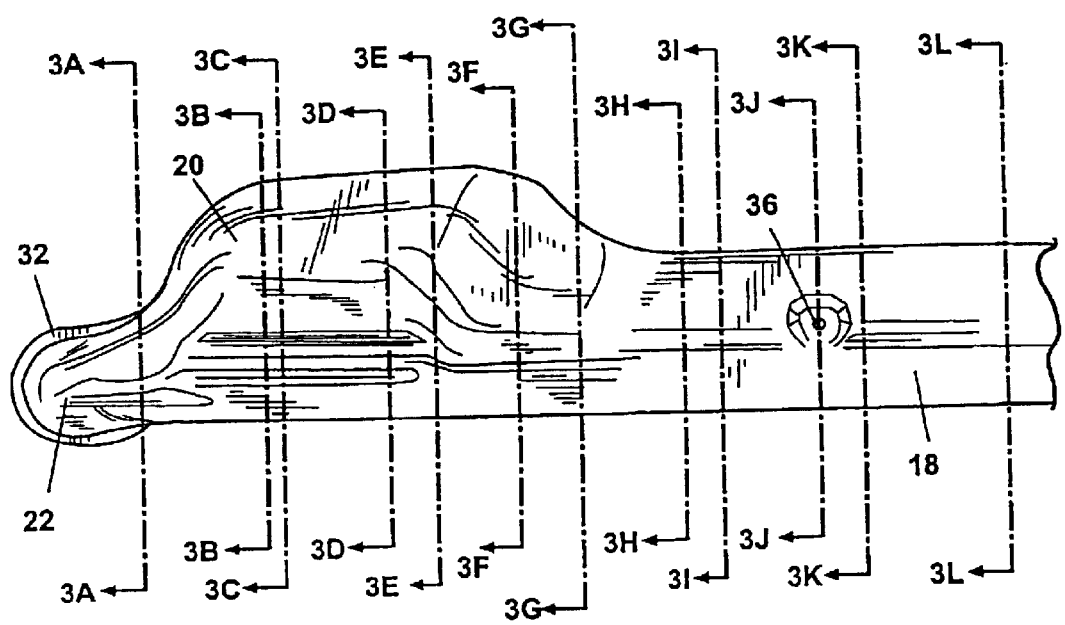
FIG. 3 is a front view of one-half of the bumper beam of FIG. 1 showing the locations of cross-section views of FIGS. 3A–L.
Figure 3A:
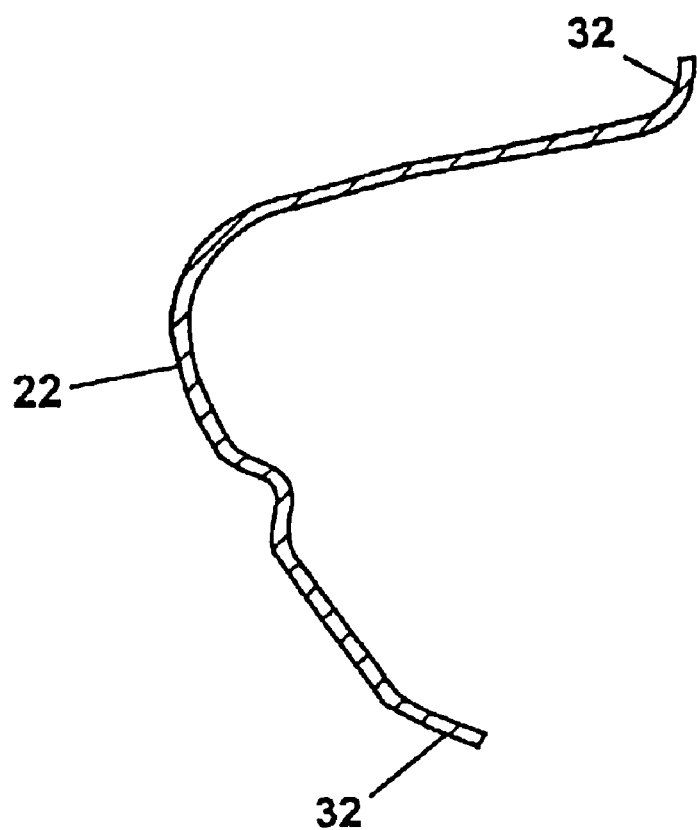
FIGS. 3A-L are cross-sectional views of the completed bumper beam shown in FIG. 15.
Figure 3B:
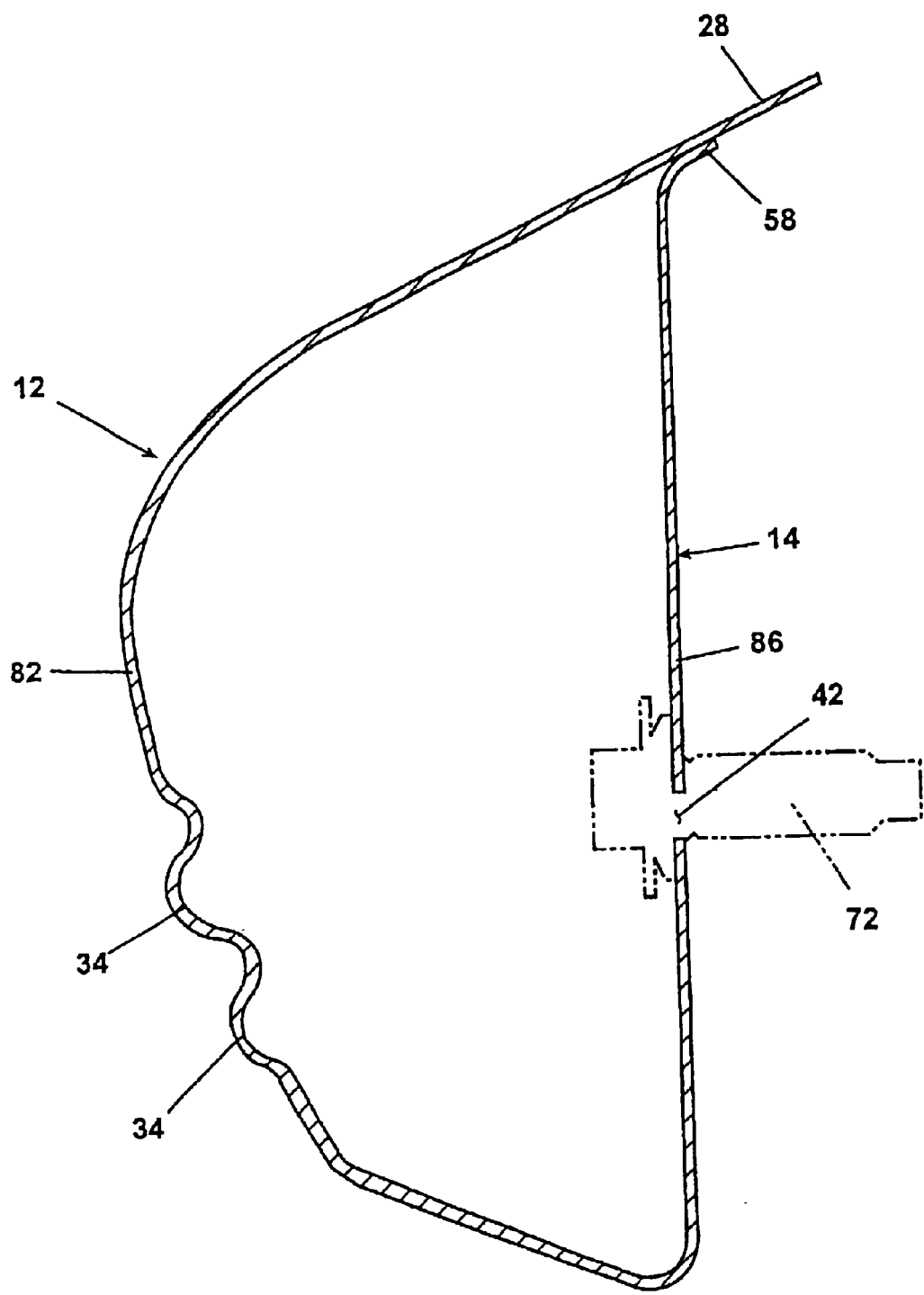
Figure 3C:
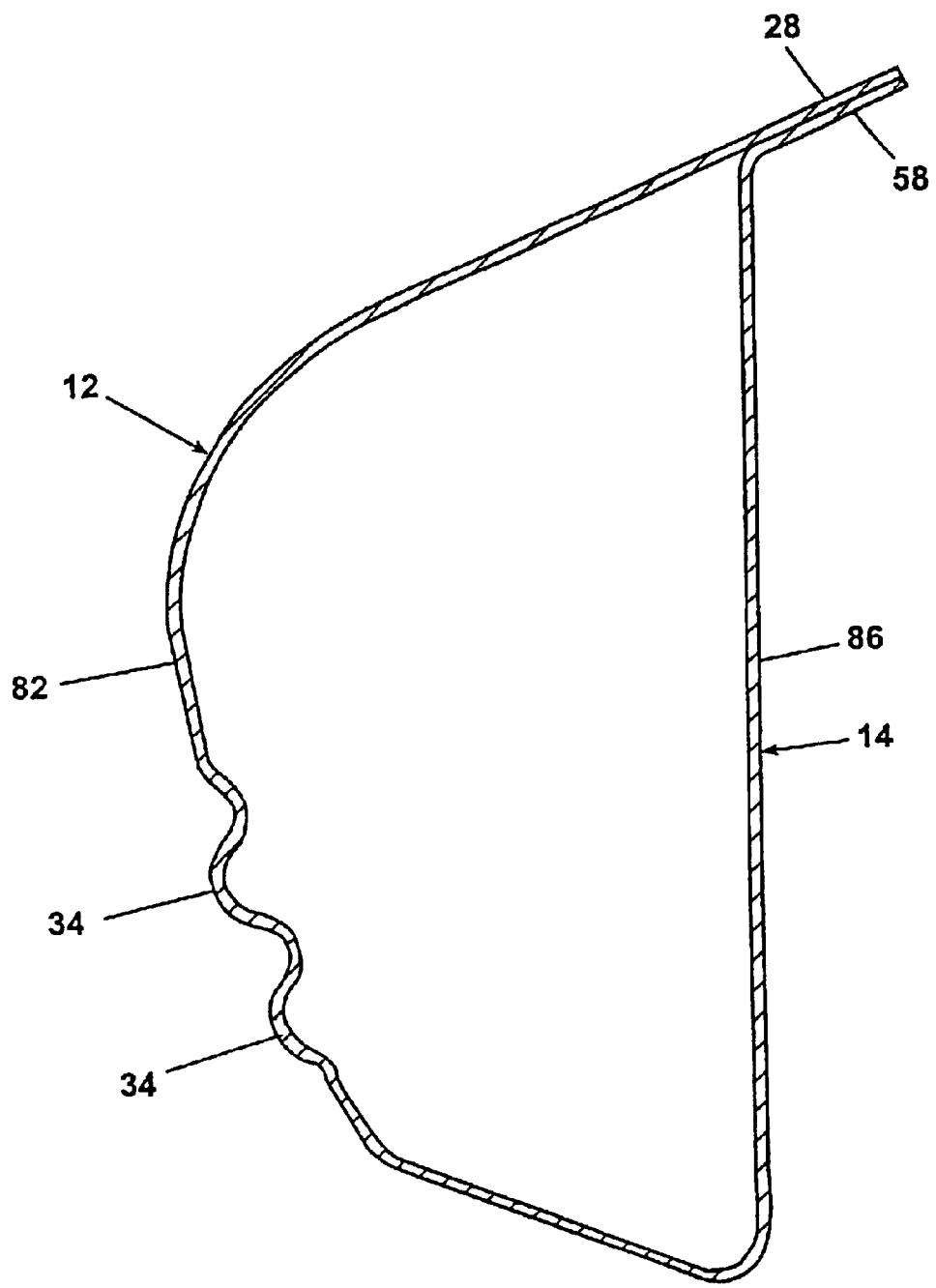
Figure 3D:
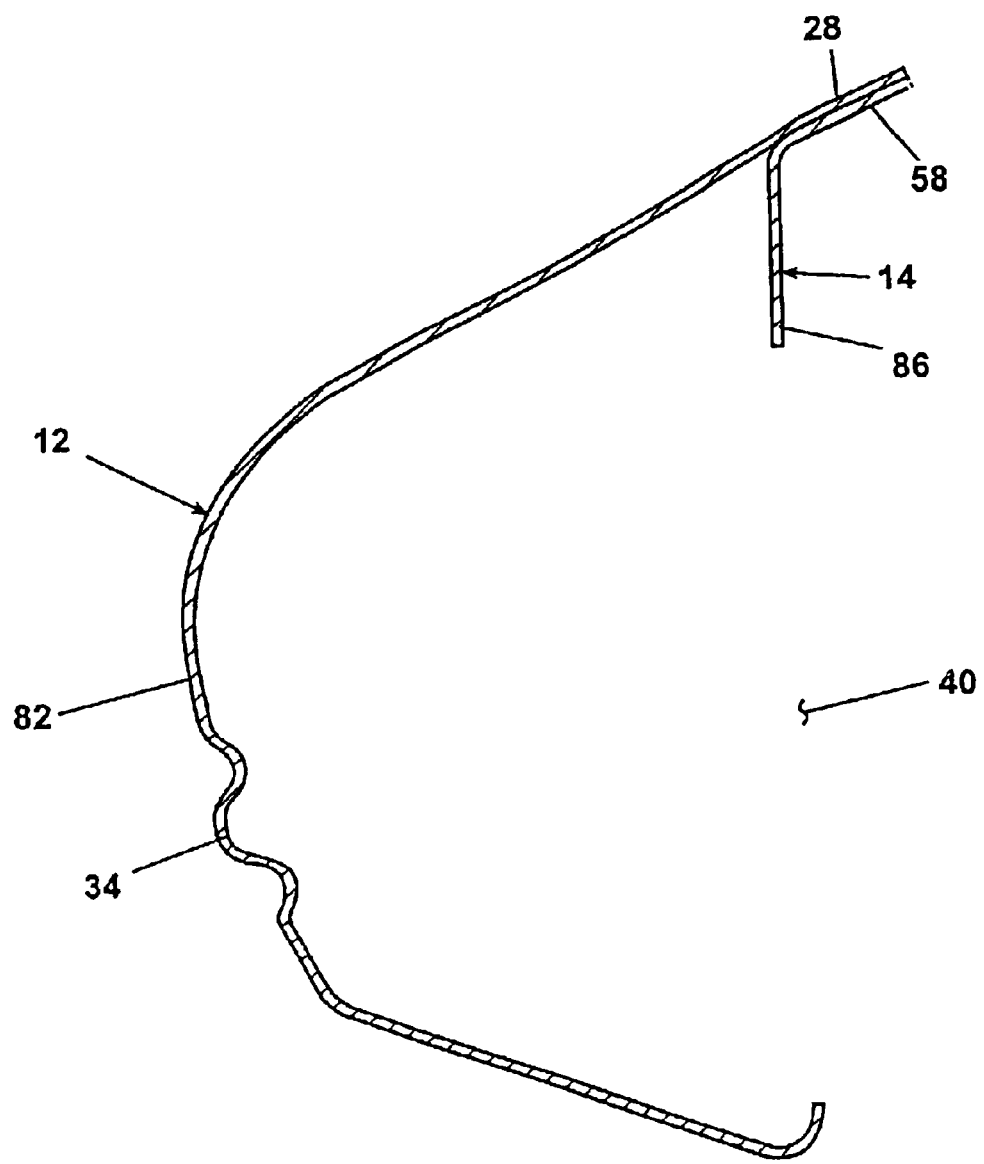
Figure 3E:
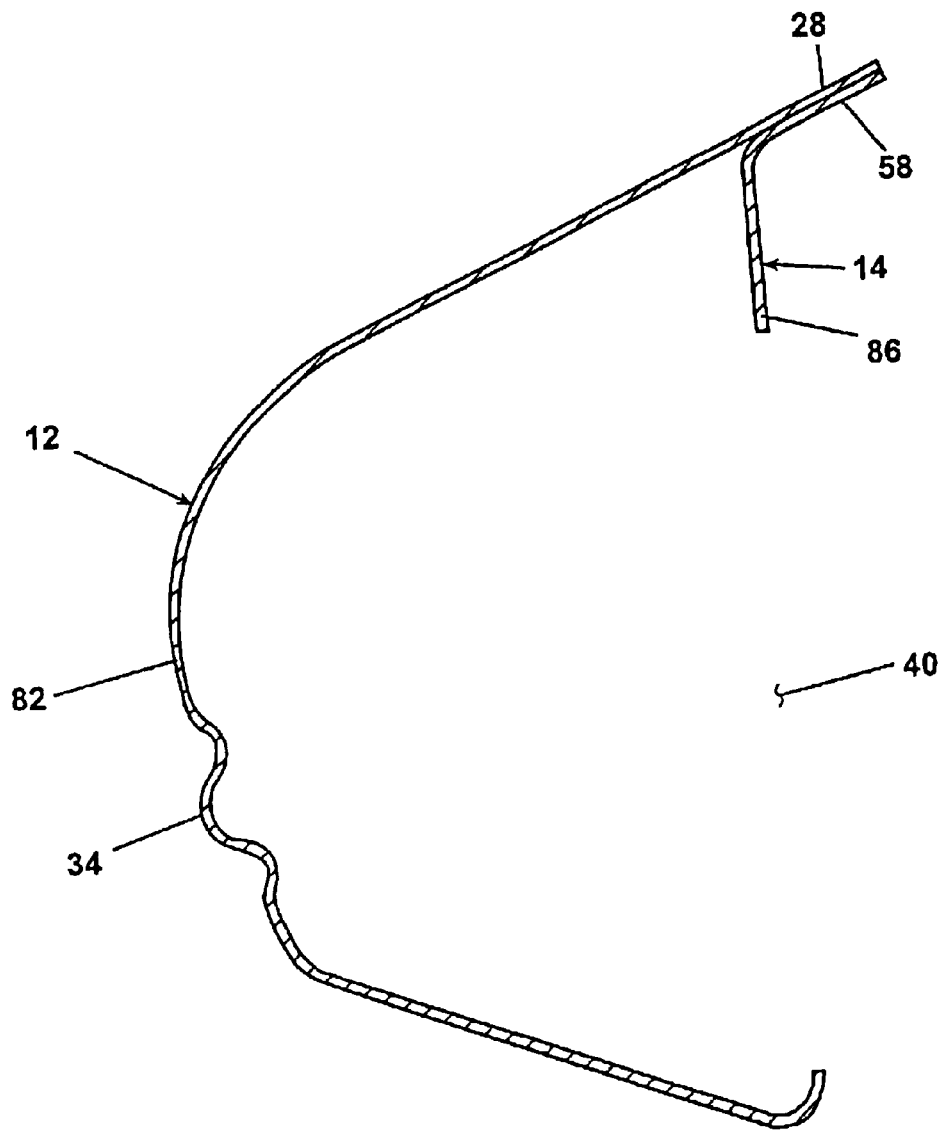
Figure 3F:
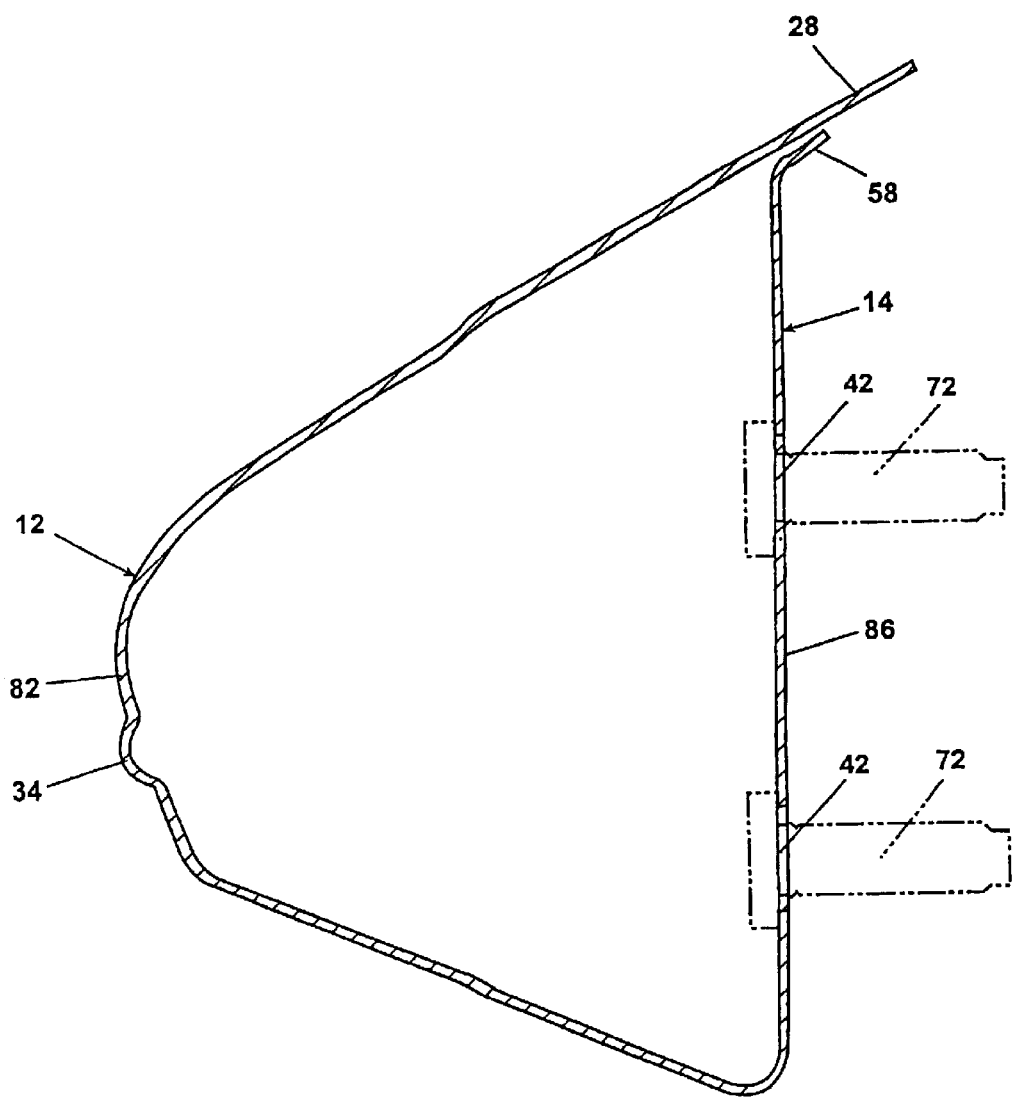
Figure 3G:
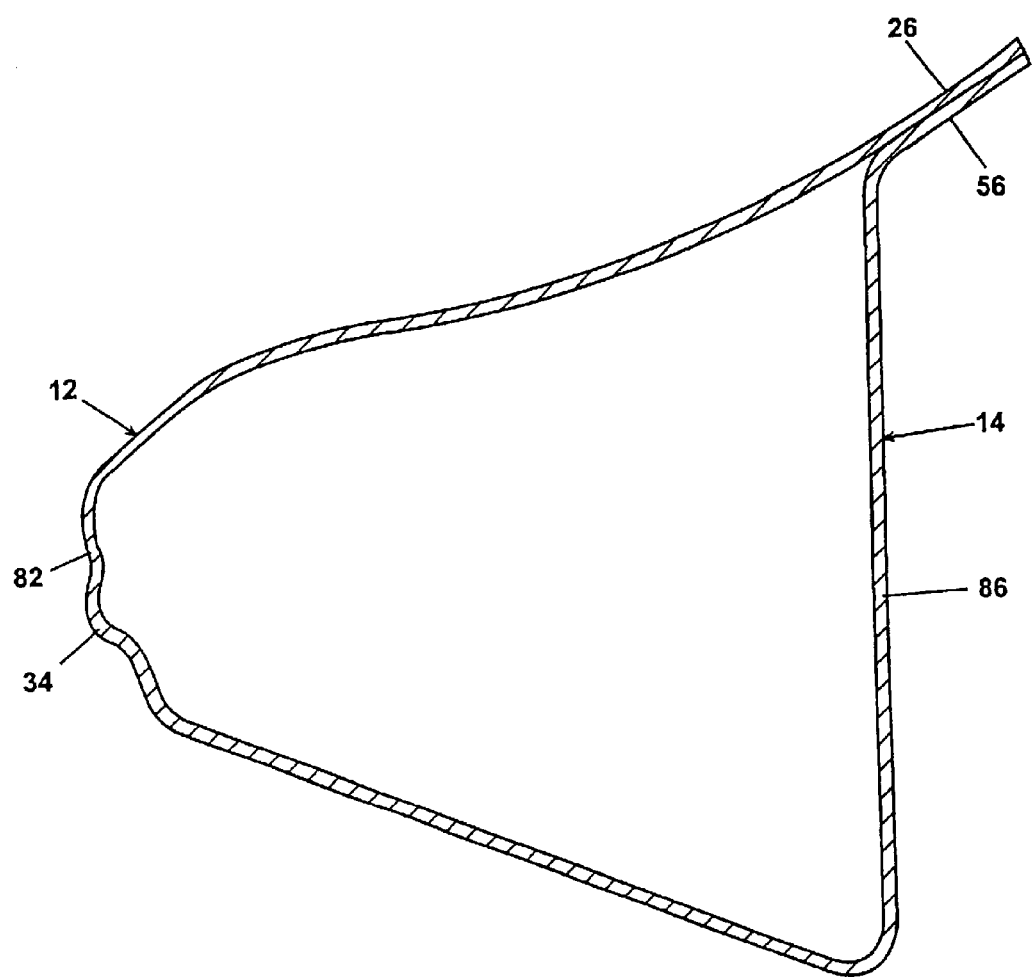
Figure 3H:
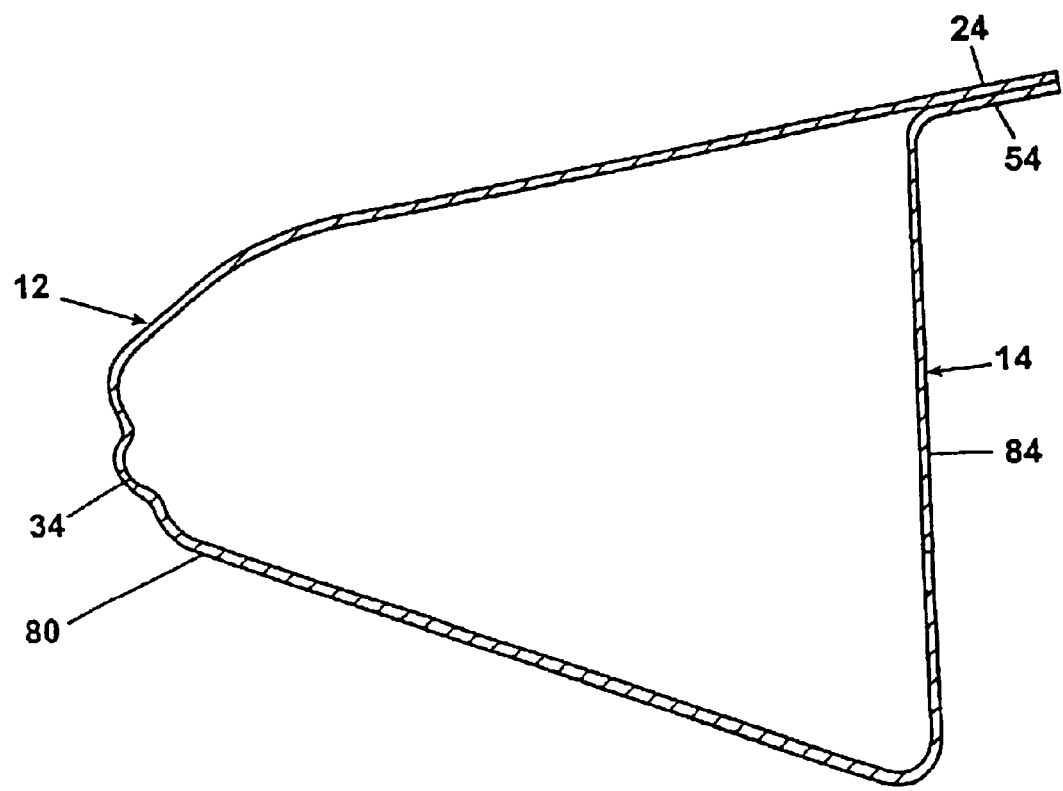
Figure 3I:
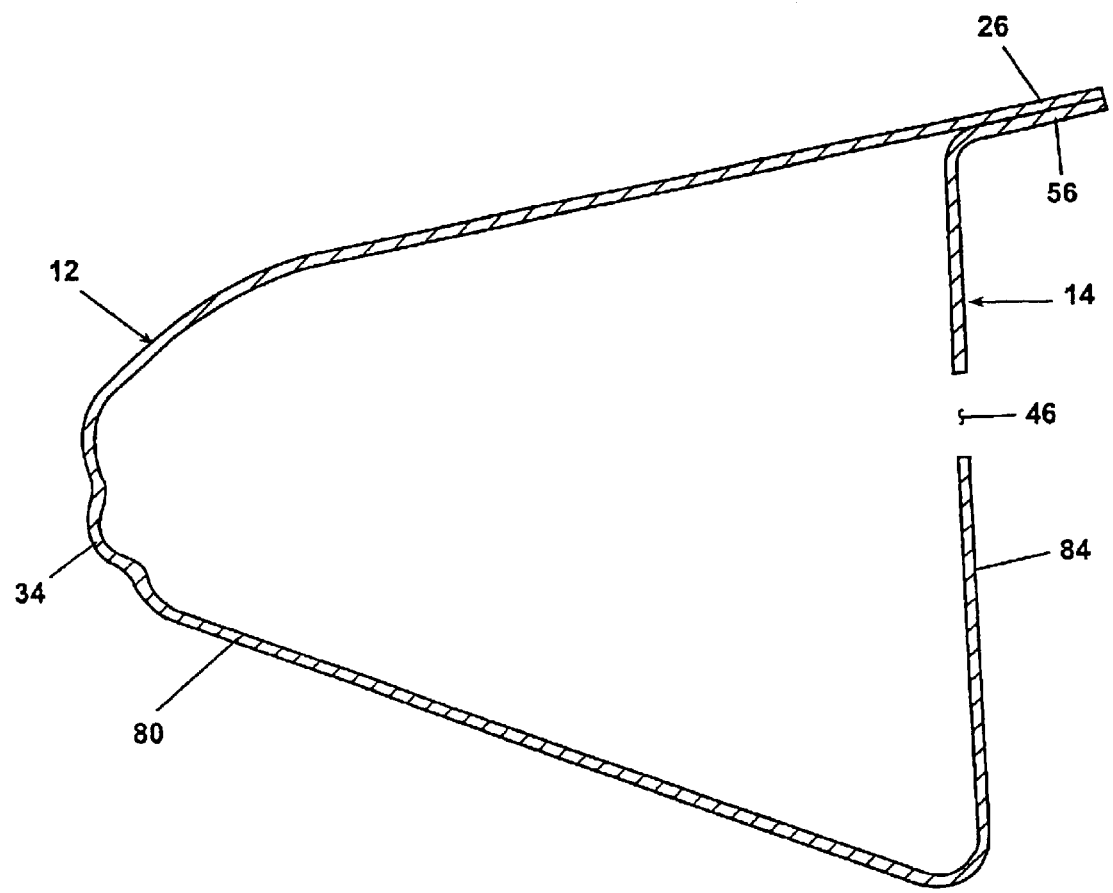
Figure 3J:
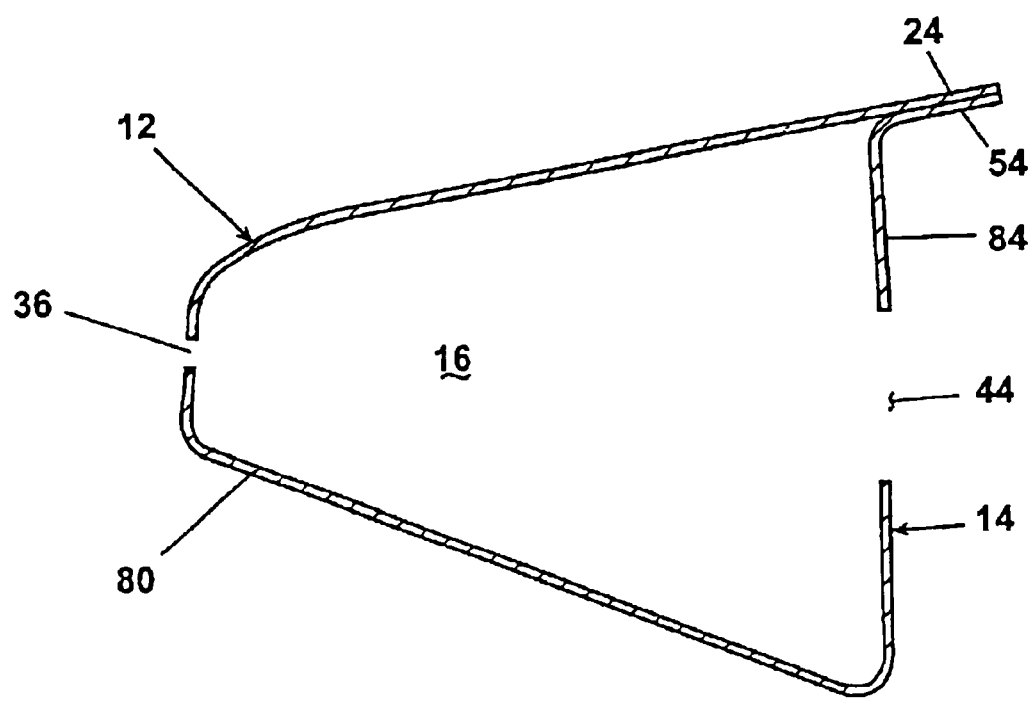
Figure 3K:
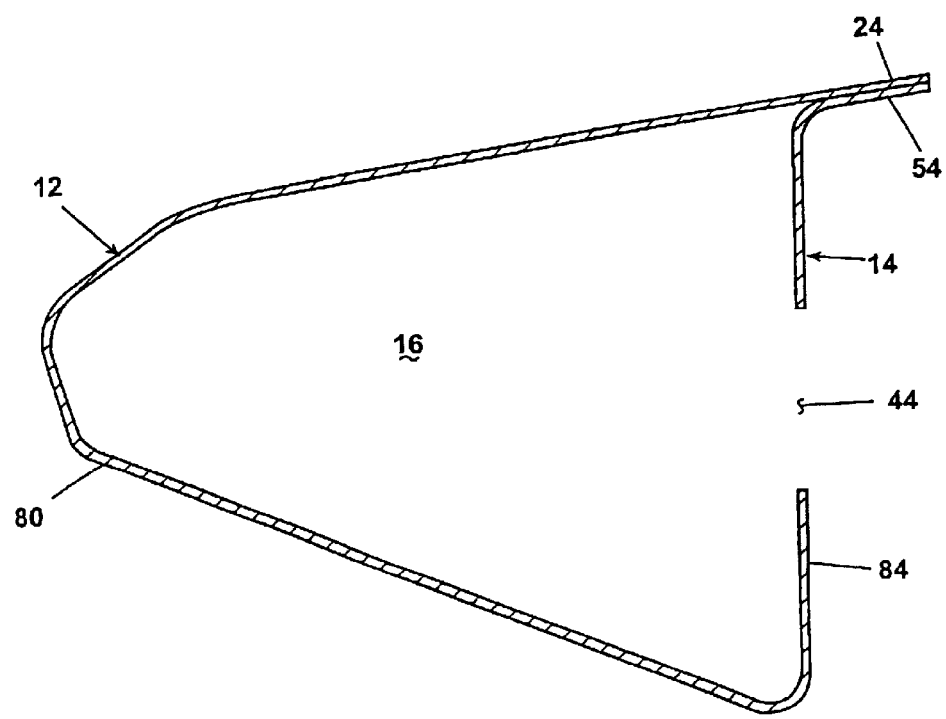
Figure 3L:
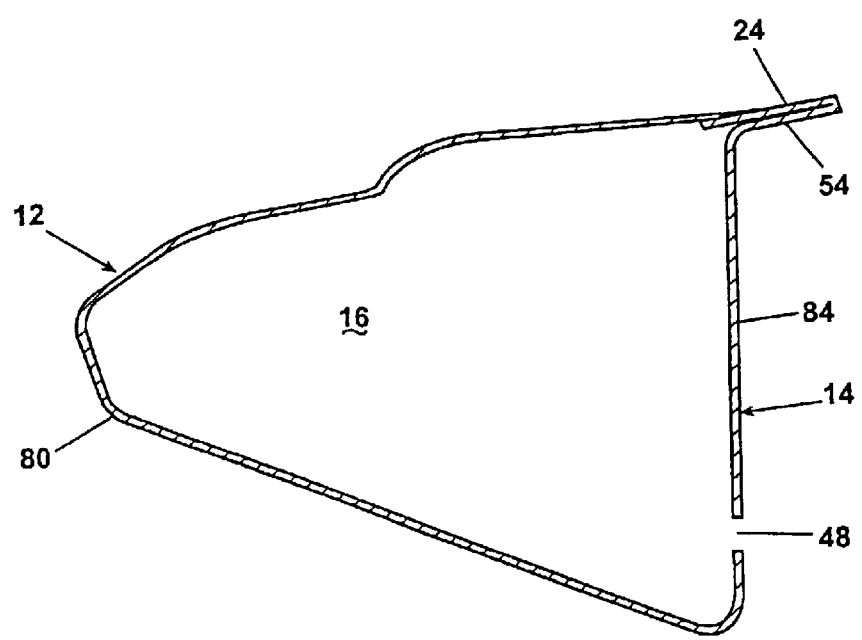

Referring to FIG. 3 and the corresponding cross sections of 3A–3L, in cross 10 section the front shell 12 defines a generally variably arcuate surface conforming generally to the styling of the vehicle to which the bumper beam 10 is to be mounted. The front shell 12 is comprised of a center ridge 80 forming a first portion of the center crosspiece 18, a pair of domed cover flanges 82 forming first portions of the frame rail pockets 20, and the end pockets 22. The upper edge of the center ridge 80 terminates in a center crosspiece flange 24. The upper edge of the domed cover flange 82 terminates in a frame rail pocket inner flange 26, a frame rail pocket upper flange 28, and a frame rail pocket outer flange 30. The center crosspiece flange 24 transitions into the inner frame rail pocket flange 26. The perimeter of the end pocket 22 terminates in an end pocket flange 32. The front shell 12 can be provided with elongated indentations or ridges to form strengthening ribs 34. The front shell 12 can also be provided with mounting apertures, such as license plate mounting apertures 36. The frame rail pocket upper flanges 28 and the center crosspiece flange 24 are provided with rear plate locking tabs 38 extending outwardly from the plane of the flanges 24,28 which are adapted to secure the rear plate 14 to the front shell 12 as hereinafter described.

The rear plate 14 is a generally flat, elongated member extending between the end pockets 22 and adapted to matingly communicate along a first longitudinal edge with a first longitudinal edge of the front shell 12 to enclose the beam interior 16, as hereinafter described. The rear plate 14 comprises a center crosspiece back portion 84 which, along with the center ridge 80, forms the center crosspiece 18, and frame rail pocket plates 86, which, along with the domed cover flanges 82, form the frame rail pockets 20.

The rear plate 14 is provided with a plurality of openings. In the preferred embodiment, the rear plate 14 is provided with frame rail openings 40, frame rail mounting bolt apertures 42, hand hold apertures 44, mounting apertures 46,48, access ports 50, and flag bolt apertures 52. The function of the rear plate openings will be described hereinafter.

The first longitudinal edge of the rear plate 14 terminates in a rear plate center crosspiece flange 54, a rear plate frame rail pocket inner flange 56, a rear plate frame rail pocket upper flange 58, and a rear plate frame rail pocket outer flange 60, which extend upwardly in a somewhat inclined orientation from the rear plate 14. The flanges 54, 56, 58 and 60 are brought into mating communication with the front shell flanges 26, 28 and 30 as hereinafter described.

The folded web 62 connecting the rear plate 14 to the front shell 12 extends longitudinally to terminate in folding notches 64. During the fabrication process, the folded web 62 comprises a folding ledge 66 (See, FIG. 5D).

Figure 4:
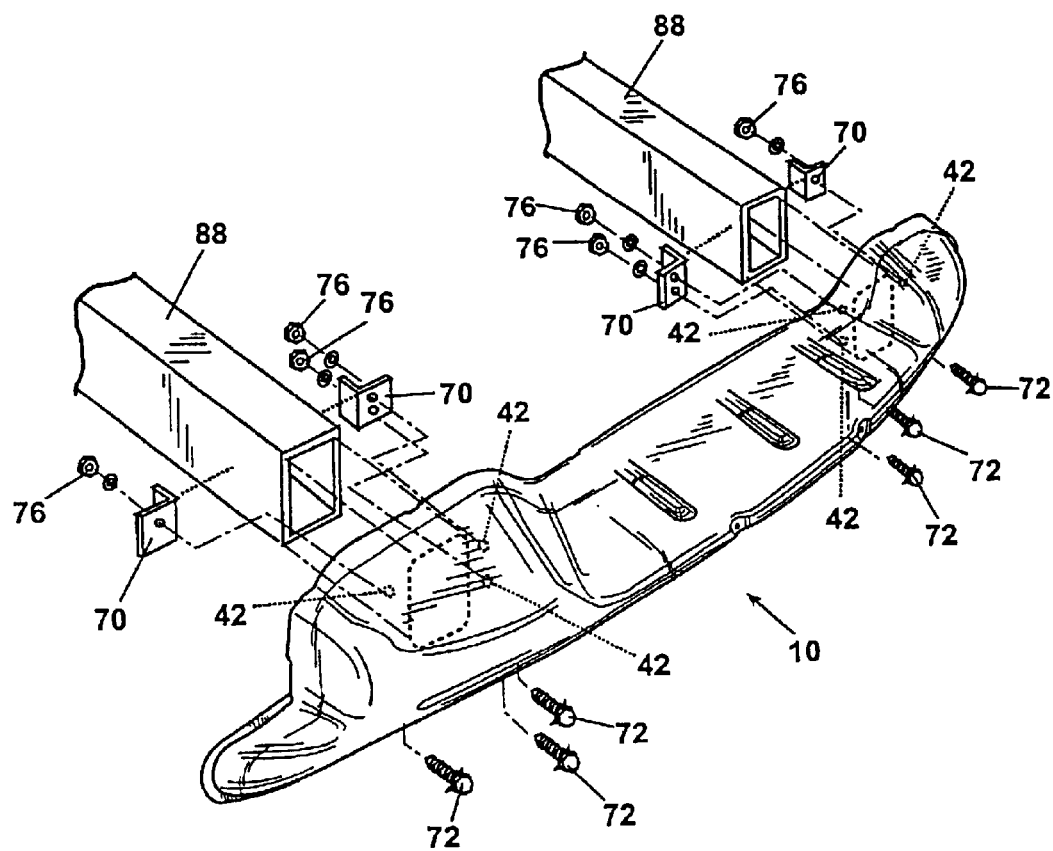
FIG. 4 is an exploded view of the bumper beam of FIG. 1 and vehicle frame rails showing the components for mounting the bumper beam to the frame rails.

The completed bumper beam 10 is mounted horizontally and transversely to the frame rails 88 of the vehicle. Referring to FIG. 4, the frame rails 88 are provided with frame rail brackets 70, which can be an integral part of the frame rails or attached to the frame rails 88 through conventional fasteners, such as bolted connections or welding.

The frame rail brackets 70 are mounted somewhat rearwardly of the forward ends of the frame rails 88 so that the frame rails 88 extend through the frame rail openings 40 into the beam interior 16 when the bumper beam 10 is mounted to the frame rails 88. Mounting bolts 72 are used to connect the bumper beam 10 to the frame rail brackets 70 by passing the mounting bolt 72 through the frame rail mounting bolt apertures 42 and mating apertures in the brackets 70. Mounting bolt washers 76 can also be provided. A mounting bolt nut 76 is used to secure the mounting bolt 72 to the bumper beam 10 and frame rail brackets 70. Mounting the frame rail brackets 70 rearwardly of the forward ends of the frame rails 88 so that frame rails 88 extend into the interior 16 of the bumper beam 10 provides a beam-to-frame connection of high rigidity and strength. Furthermore, such a connection moves the bumper beam 10 closer to the vehicle body, providing a bumper beam configuration more readily conformable to the overall styling of the vehicle. Finally, the brackets 70 can be selectively mounted along the frame rails 88 to vary the length of the frame rails 88 inserted into the bumper beam 10 for strength and aesthetic considerations. Hand hold cutouts 44 are provided to enable the bumper beam 10 to be easily lifted and manipulated for mounting the bumper beam 10 to the frame rails 88. The flag bolt apertures 52 are adapted to receive conventional flag bolts (not shown) for mounting 10 the bumper beam 10 to the frame along with apertures 42. Access ports 50 as well as apertures 46, 48 are provided for mounting optional and additional accessory components to the bumper beam. Such accessories include, for example, fog lamps, heater plugs, temperature sensors, wiring clips/connectors, license plate brackets, spoilers and other aerodynamic body features and the like. The bumper beam 10 is fabricated in a series of steps that comprise progressively stamping a flange of flat stock, referred to as a "blank," into a desired shape using a series of conventional machine presses and dies, and folding the rear plate 14 into the front shell 12. The fabrication process is automated and comprises transferring the blank through a series of stamping and folding operations. The blank is transported through successive stages by the use of robotic arms. Fabrication of the bumper beam 10 begins with a blank that is initially cut to a size approximating that of the bumper beam 10.

Figure 6:
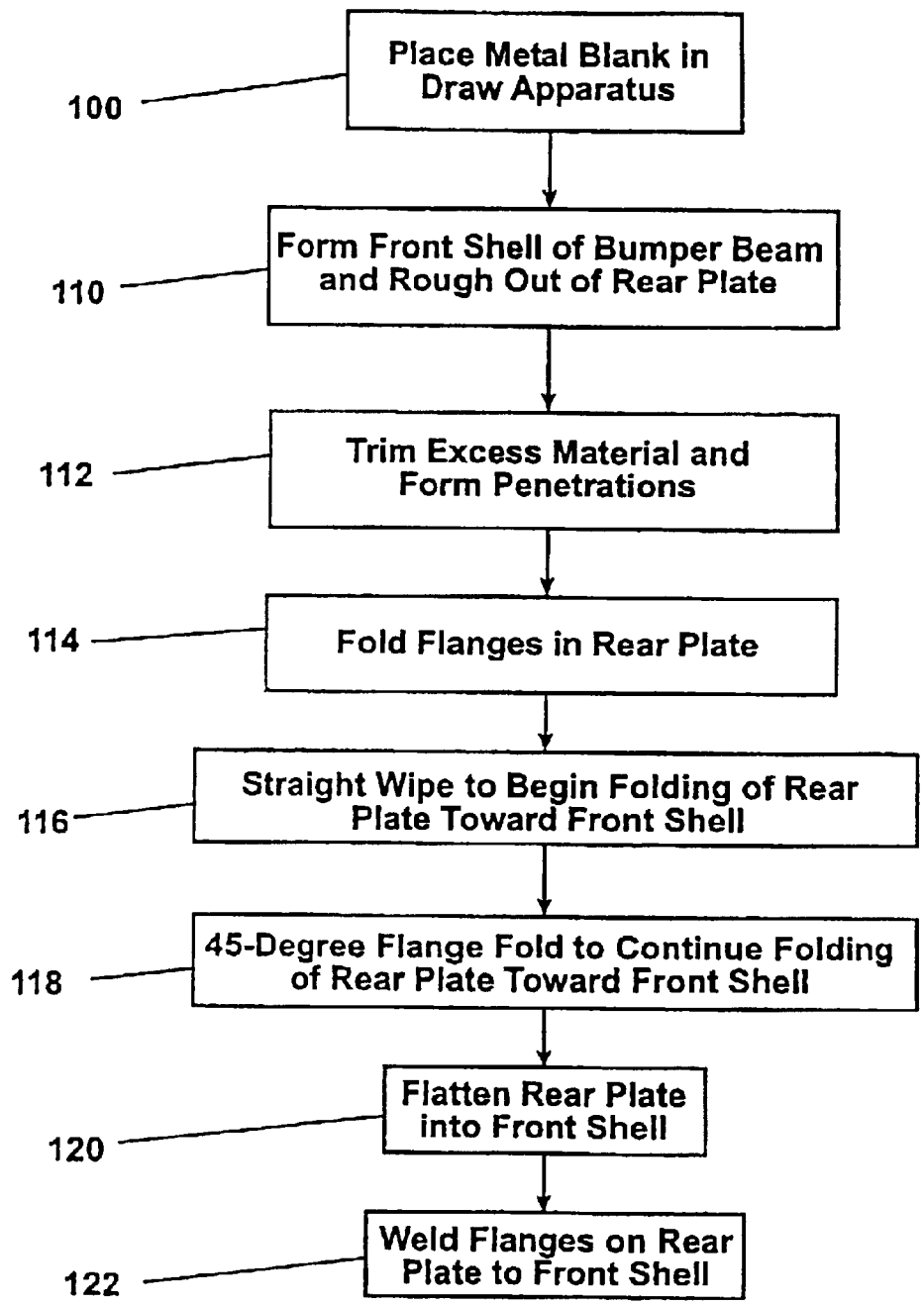
FIG. 6 is a flowchart of a bumper beam fabrication process according to the invention.
Figure 7:
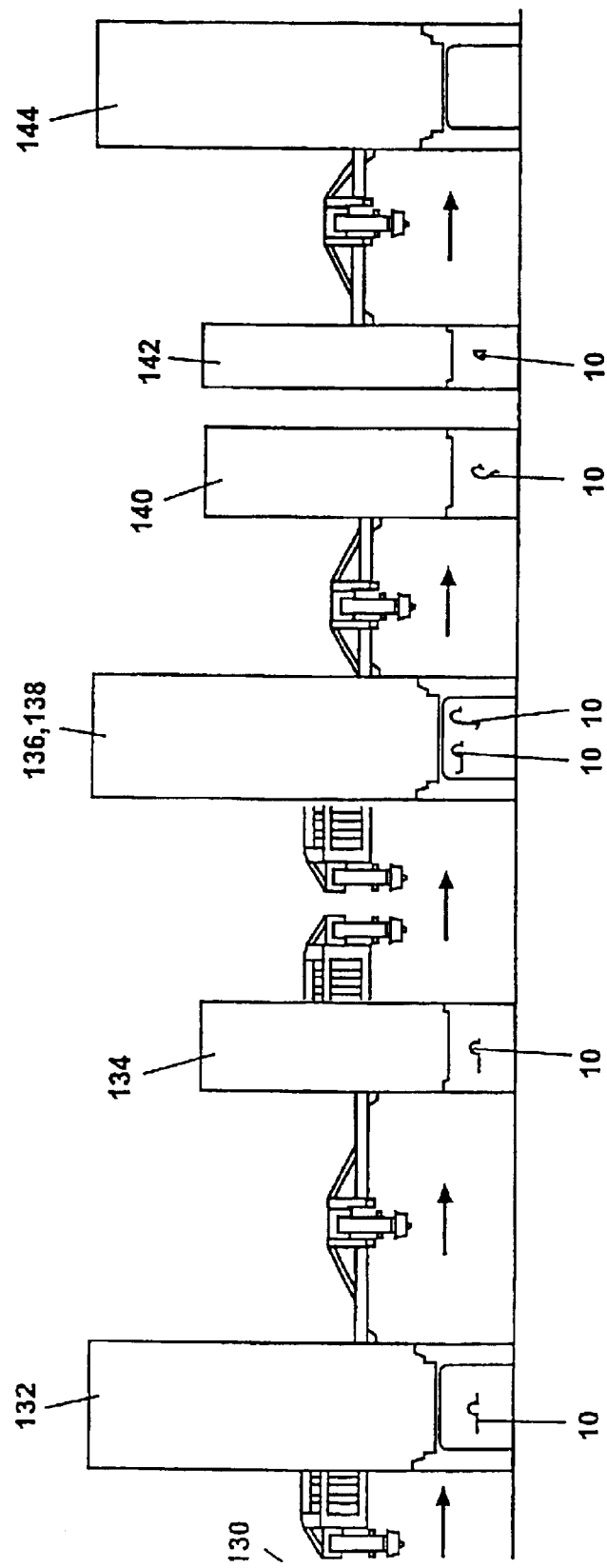
FIG. 7 is a schematic view of the various steps comprising the bumper beam fabrication process of FIG. 6.

Referring to FIGS. 5-7, the blank is first trimmed to an initial configuration in a blank die operation 100 which is completed at a blank die station 130, and leaves the operation in a generally plate-like shape. A robotic arm then transfers the blank to a draw die station 132 where the front shell 12 is stamped in the blank in a draw step 110 using a first die set. At the completion of the draw step 110, only the general shape of the front shell 12 has been formed in the blank. See, FIG. 5A. A robotic arm then transfers the blank to a trim and pierce die station 134 for a trim and pierce step 112 where excess material from the perimeter of the blank is removed, and the various cutouts and apertures 36, 40, 42, 44, 46, 48, 50 and 52 are punched in the rear plate 14. See, FIG. 5B. A robotic arm then, transfers the blank to a flange die station 136 where the flanges 54, 56, 58 and 60 are formed in the rear plate 14 in a flange formation step 114. In the preferred embodiment, the same station, i.e. the same press, is used to complete both the flange formation step 114 and a straight wipe step 116. Alternatively, the straight wipe step 116 can be completed in a separate station 138. In the flange formation step 114, the flanges 54, 56, 58 and 60 are folded upwardly so that, when the back plate 14 is folded toward the interior of the front shell 12, the flanges 54, 56, 58 and 60 will be in contact with the interior of the front shell 12. See, FIG. 5C. In the straight wipe step 116, the rear plate 14 is folded approximately 90 degrees toward the interior of the front shell 12 along a longitudinal line defining an interface between the front shell 12 and the folded web 62, thus forming a folding ledge 66. The folding ledge 66 provides a contact surface for a folding tool to further fold the rear plate 14 into the front shell 12, thus eliminating the tendency of the rear plate 14 to spring away from the front shell 12 at the completion of the folding processes.

In the straight wipe step 116, the center crosspiece flange 24 and frame rail pocket flanges 26, 28 and 30 are formed. See, FIG. 5D. The blank is then transferred by a robotic arm to the 45° flange station 140 where the rear plate 14 is further folded toward the interior of the front shell 12 in the 45° flange formation step 118. See, FIG. 5B. The blank is then transferred to the flatten die station 142 where the final folding of the rear plate 14 is performed in the flatten step 120 to align the rear plate flanges 54, 56, 58 and 60 into contact with the front shell flanges 24, 26, 28 and 30, and form the finished bumper beam 10. In the flatten step 120, the rear plate locking tabs 38 are folded downwardly to lock the rear plate 14 into the front shell 12. See, FIG. 2C. The bumper beam 10 is then transferred by a robotic arm to the welding station 144 where the front shell flanges 24, 26, 28 and 30 are spot welded to the rear plate flanges 54, 56, 58 and 60 in a spot weld step 122 to complete the bumper beam 10.

The bumper beam 10 according to the invention is an improvement over the prior art roll formed bumper. As opposed to the arch configuration of the roll formed bumper, the invention provides a bumper beam 10 with a truss configuration, which provides an increased straight-to-weight ratio. Additionally, impact loads which would be otherwise transferred as lateral loading to the vehicle frame with the prior art arch configuration are distributed by the bumper beam 10 to the vehicle frame with a greatly decreased, if not eliminated, lateral load component. The bumper beam 10 has a lower weight, which will improve fuel efficiency. Furthermore, the bumper beam 10 can be easily formed into complex shapes to conform to the overall styling of the vehicle, while satisfying impact specifications. Significantly, the folding of the rear plate 14 into the front shell 12 eliminates the need for forming two separate flanges and welding the flanges together along an additional mating flange structure, thus simplifying fabrication and reducing costs.

While the invention has been specifically described in connection with certain specific embodiments thereof it is to be understood that this is by way of illustration and not of limitation. Reasonable variation and modification are possible within the scope of the forgoing description and drawings without departing from the spirit of the invention.

We claim:

1. A bumper beam having a front face and a back plate wherein the bumper beam has a generally truss-shaped section, the front face has a longer line than the back plate and the front face of the bumper beam has a curved arch and the back plate is generally planar.

2. The bumper beam of claim 1 wherein, when the bumper beam is mounted to a vehicle undergoing a front or rear impact force, the impact force trying to flatten the curved arch front face is resisted by tension on the back plate.

3. The bumper beam of claim 1, wherein the bumper beam has a geometry that follows the shape of an external bumper fascia employed therewith, without foam fillers.

4. A bumper beam having a front face and a back plate wherein the bumper beam has a generally truss-shaped section and the front face has a longer line than the back plate and wherein the bumper beam further has a single welded seam to form a closed section beam.

5. A bumper beam having a front face and a back plate wherein the bumper beam has a generally truss-shaped section and the front face has a longer line than the back plate and wherein the bumper beam front face and back plate lack any cross-bracing therebetween.

6. A bumper beam having a front face and a back plate wherein the bumper beam has a generally truss-shaped section and the front face has a longer line than the back plate and wherein the bumper beam comprises a single piece of steel.

7. The bumper beam of claim 4, 5 or 6 wherein the steel is conventional steel, as opposed to ultra high strength steel.

8. The bumper beam of claim 4, 5 or 6 wherein the front face of the bumper beam has a curved arch and the back plate does not have a curved arch.

9. The bumper beam of claim 4, 5 or 6 wherein, when the bumper beam is mounted to a vehicle undergoing a front or rear impact force, the impact force trying to flatten the curved arch front face is resisted by tension on the back plate.

10. The bumper beam of claim 4, 5 or 6 wherein the bumper beam has a geometry that follows the shape of an external bumper fascia employed therewith, without foam fillers.

* * * * *